April 5, 1966  TOMOKICHI TANGO ET AL  3,244,967
THREE-PHASE VOLTAGE REGULATOR
Filed Feb. 27, 1962  2 Sheets-Sheet 1

INVENTOR.
Tomokichi Tango
Hiroshi Kobayashi
BY Takeshi Anayama
Eijiro Miyazawa

Wenderoth, Lind & Ponack, Attorneys

INVENTOR.
Tomokichi Tango
Hiroshi Kobayashi
Takeshi Anayama
Eijiro Miyazawa
BY

United States Patent Office 3,244,967
Patented Apr. 5, 1966

3,244,967
THREE-PHASE VOLTAGE REGULATOR
Tomokichi Tango, Fujisawa, Kanagawa, Hiroshi Kobayashi, Kawasaki, Kanagawa, Takeshi Anayama, Sendai, Miyagi, and Eijiro Miyazawa, Mitaka, Tokyo, Japan, assignors, by mesne assignments, to Yawata Iron & Steel Co., Ltd., Tokyo, Japan, a corporation of Japan
Filed Feb. 27, 1962, Ser. No. 176,072
Claims priority, application Japan, Mar. 1, 1961, 36/9,490, 36/6,741, 36/6,742
11 Claims. (Cl. 323—89)

This invention relates to a three-phase voltage regulator. More particularly the present invention relates to a new and improved three-phase voltage regulator consisting of three linear reactors, three saturable reactors and three parallel resonance condensers connected in a novel manner.

There have already been suggested many three-phase voltage regulators. While many of those known devices are satisfactory for some applications, the have a number of limitations inherent in their design and making them impractical in many cases due to their inefficiency, slow response, output wave distortion, poor electrical characteristics and so forth.

A main object of the present invention is to provide a three-phase voltage regulator having high efficiency and quick response, and which supplies a well balanced three-phase constant voltage with good sinusoidal wave form by means of a simple construction.

The three-phase voltage regulator according to the present invention comprises three linear reactors each having a primary and secondary winding wound on a common magnetic core. Each reactor is connected between an input and an output terminal. The regulator further has three saturable reactors each of which has at least a primary winding wound on a magnetic core, and three condensers, each condenser being connected in parallel with a respective primary winding of a saturable reactor to form a tank circuit resonating at a fundamental frequency. Each tank circuit is connected to a respective one of primary windings of the linear reactors. Coupling means is provided coupling the tank circuits only to each other for substantially eliminating third harmonics and multiples thereof in the tank circuits. By this means, such harmonics are substantialy eliminated from the output voltage at the output terminals.

Embodiments of the present invention shall be described in the following with reference to the accompanying drawings, in which.

Figure 1:
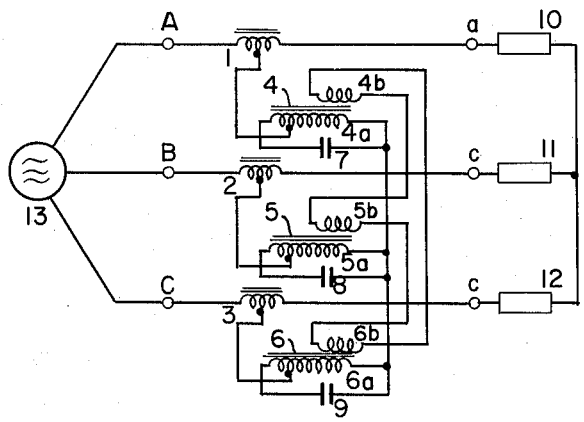
FIGURE 1 is a circuit diagram of an embodiment of the present invention.
Figure 2:
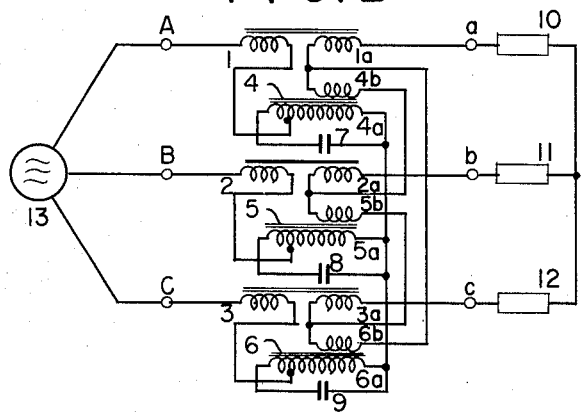
FIGURES 2, 3, 4, 5 and 6 are circuit diagrams of modified embodiments of the present invention.
Figure 3:
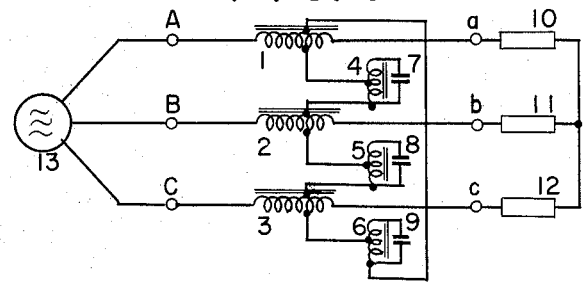

In FIGURE 1, 1, 2 and 3 are three linear reactors each having a primary and secondary winding which are electrically connected; 4, 5 and 6 are three saturable reactors which have primary windings 4a, 5a and 6a, and secondary windings 4b, 5b and 6b respectively; 7, 8 and 9 are three resonance condensers connected in parallel with the respective reactors 4, 5 and 6; 10, 11 and 12 are loads and 13 is a three-phase alternating current source. In the present invention, the windings of linear reactors 1, 2 and 3, and the windings of saturable reactors 4, 5 and 6 are wound on magnetic cores respectively.

The primary winding 4a of saturable reactor 4 and the condenser 7 are connected in parallel so as to form a tank circuit resonating at the fundamental frequency; the primary winding 5a of saturable reactor 5 and the condenser 8 are connected in parallel so as to form a tank circuit resonating at the fundamental frequency; and the primary winding 6a of saturable reactor 6 and the condenser 9 are connected in parallel so as to form a tank circuit resonating at the fundamental frequency. These three tank circuits are star connected at one end of the primary winding of the saturable reactor, and each of these three tank circuits has a terminal at a point intermediate the ends of the primary winding of the saturable reactor. Each of said terminals is connected to one point in the windings of the respective linear reactors 1, 2 and 3. Each of the said linear reactors 1, 2 and 3 is connected to the terminals A, B and C of voltage source 13 at one end and is connected to the terminals a, b and c for the load at the other end.

The secondary windings 4b, 5b and 6b of the saturable reactors are connected in delta. By reason of this connection, the potential at the star connected point of the primary windings of the saturable reactors becomes nearly equal to the potential of the neutral point of the voltage source. The explanation for this fact can be easily deduced analytically. Thus, in considering its function as being to supply constant output voltage, the device shown in FIG. 1 can be considered to be the same as if the said star connected neutral point of the primary windings were connected to the neutral point of the voltage source.

Therefore, in our three-phase device, the exciting current of the saturable reactor will vary in response to the voltage of the three-phase alternating current source. The algebraic sum of currents flowing in the saturable reactor and condenser lag when the voltage of the supply 13 is high and flow in the linear reactors so as to increase the voltage drop in the linear reactor, and lead when the voltage of the supply 13 is low and flow in the linear reactors so as to decrease the voltage drop in the linear reactor. Thus the voltage at the terminals a, b and c can be kept constant irrespective of the voltage of the supply 13. Thus the reason why the constant voltage at the output terminals can be obtained is clear even in the three-phase case.

And moreover, in our present invention, the secondary windings of the saturable reactors play a very important roll.

In FIG. 1, since the primary windings 4a, 5a and 6a of saturable reactors 4, 5 and 6 are star connected, the third harmonic currents and multiples thereof caused by the non-linearity of the magnetization characteristics of the cores of the saturable reactors cannot flow in the circuit. And thus the exciting current to the saturable reactors becomes much more sinusoidal in form as compared with a single phase device.

And furthemore, in the device of the present invention, since the saturable reactors have secondary windings 4b, 5b and 6b connected in delta, the third harmonic magnetic fluxes and multiples thereof in the cores of the saturable reactors cannot be induced even if the exciting current be sinusoidal. Hence the voltages induced in the primary windings by the sinusoidal magnetic fluxes must be sinusoidal in form. This fact is a very important feature of the present device.

Thus the device of the present invention supplies three-phase constant voltage of good sinusoidal form at the load terminals a, b and c, without a complicated filter circuit.

It may be clearly understood that the device shown in FIG. 1 is thus not a mere combination of three sets of single phase devices.

It is clear that the voltage on each tank circuit is kept constant, as in the case of a single phase device, but the phase relation between three voltages of three tank circuits will be indeterminate, if there is no device such as the secondary windings 4b, 5b and 6b of the saturable reactors 4, 5 and 6 connected in delta.

In the device of the present invention, as there are such secondary windings 4b, 5b and 6b connected in delta, the sum of the induced voltages in the primary windings 4a, 5a and 6a of saturable reactors 4, 5 and 6 must be zero. And furthermore, these induced voltages must be equal in their amplitudes as stated above. Therefore, the phase differences cannot deviate from 120°, even if there is unbalance in the source voltage or in the load condition. Thus the present invention can provide three-phase voltage regulation with the output voltage in good sinusoidal wave form, in fixed and good phase relation, and remaining in good condition even in the case of an unbalanced voltage source or an unbalanced load.

FIGURE 2 shows a circuit diagram of another embodiment of the present invention. The difference between this circuit and the circuit shown in FIGURE 1 is that, in the circuit shown in FIGURE 2, the secondary windings 4b, 5b and 6b of the saturable reactors 4, 5 and 6 are connected respectively in series to loads 10, 11 and 12 through the secondary windings 1a, 2a and 3a of the respective linear reactors. This circuit produces an output voltage different from the supply voltage. It is the same as the circuit shown in FIGURE 1 in that the balance of the three phases will be increased by the delta-connection of the secondary windings of the saturable reactors.

FIGURE 3 is a circuit diagram of another embodiment of the present invention.

The difference between this circuit and that of FIG. 1 is that the saturable reactors 4, 5 and 6 have no secondary windings and are connected in delta, and the said delta connected tank circuit is connected with the linear reactors so that each tank circuit is connected between two linear reactors.

The delta connection formed by the saturable reactors acts quite the same as the delta connection formed by the secondary windings of the saturable reactors shown in FIG. 1. The whole of this delta connected circuit can be considered to be in the same condition as the star connected point of the primary windings of the saturable reactors in the circuit of FIG. 1, insofar as the current flowing to the whole network of said delta connection from the voltage source is concerned. Thus the function of the circuit of FIG. 3 is quite the same as the circuit of FIG. 1.

Figure 4:
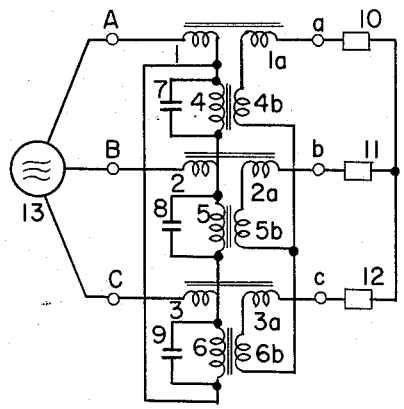
Figure 5:
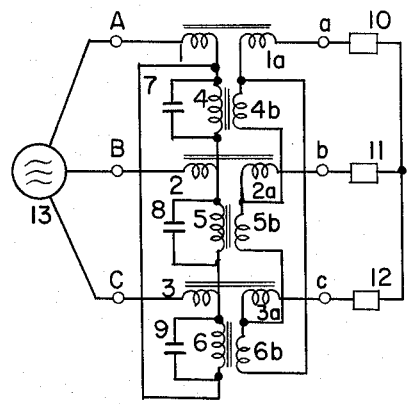

FIGURES 4 and 5 are also circuit diagrams of the other embodiments of the present invention. In the embodiment shown in FIGURE 4, secondary windings 4b, 5b and 6b are applied to the saturable reactors 4, 5, and 6, and are connected in star. The linear reactor windings are divided into two parts 1 and 1a, 2 and 2a, and 3 and 3a so as to obtain a different output voltage from supplied voltage. The linear reactor windings 1a, 2a and 3a are connected in series between the secondary windings 4b, 5b and 6b and load terminals a, b and c.

In FIGURE 5, too, the component parts 1 to 9 are the same as in FIGURE 3. The secondary windings 4b, 5b and 6b of the saturable reactors are connected in delta so that a current may be fed to the loads 10, 11 and 12 through the secondary windings 1a, 2a and 3a of the linear reactors of the corresponding phases from the respective vertexes of the delta-connection.

Figure 6:
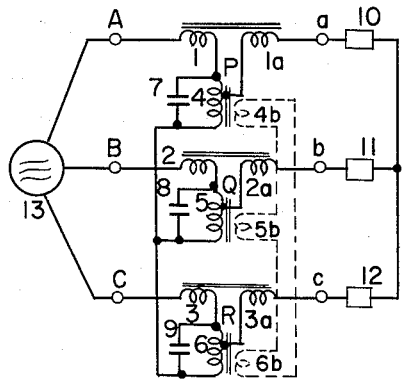
Figure 7:
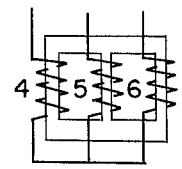
FIGURE 7 is a sketch showing the construction of a three-leg type magnetic core which can be used in the present invention.

In the embodiment of the present invention shown in FIGURE 6, it is also desired to make the values of the input voltage and output voltage different from each other. In FIGURE 6, 1, 2 and 3 are the primary windings of the linear reactors and 4, 5 and 6 are the primary windings of the saturable reactors. 7, 8 and 9 are condensers and are connected in parallel with the primary windings 4, 5 and 6 of the saturable reactors so as to form a plurality of tank circuits each resonating at the fundamental frequency. The primary windings 4, 5 and 6 of these saturable reactors are provided with intermediate taps P, Q and R, respectively. The linear reactors have secondary windings 1a, 2a and 3a which are magnetically coupled with the primary windings 1, 2 and 3 of the linear reactors, respectively, so that a current may be fed to loads 10, 11 and 12 through the above mentioned secondary windings 1a, 2a and 3a in series from said taps P, Q and R, respectively, at a voltage different from the primary voltage. Further, the secondary windings 4b, 5b and 6b of the saturable reactors are connected in delta so that the balance of the three phases may be improved and the third harmonics and multiples thereof may be substantially eliminated. It is evident that, if the core of the saturable reactor is a three-leg type as in the embodiment shown in FIGURE 7 and the sum of the fluxes in the three legs is always substantially zero, the delta-connected circuit of the secondary windings 4b, 5b and 6b shown in FIGURE 6 may be eliminated.

Figure 8:
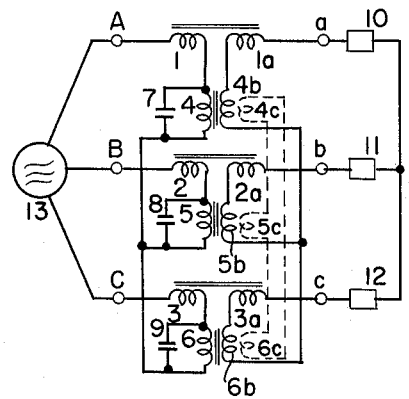
FIGURE 8 is a circuit diagram of still another embodiment of the present invention.

FIGURE 8 is a circuit diagram of still another embodiment of the present invention. This embodiment is a three-phase voltage regulator wherein, in order to insulate the input voltage and output voltage from each other, tertiary windings 4c, 5c and 6c are applied to the saturable reactors and are connected in delta, and the primary windings 4, 5 and 6 and secondary windings 4b, 5b and 6b are star connected. Thus the FIG. 8 shows a modified circuit diagram of FIG. 6, to obtain an output voltage insulated from the supply voltage.

As several embodiments of new and improved three-phase voltage regulators constructed in accordance with the invention have been described, it is believed obvious that other modifications and variations of the invention are possible in the light of the above teachings. It is, therefore, to be understood that changes may be made in the particular embodiments of the invention which are within the full intended scope of the invention as defined by the appended claims.

What we claim is:

1. A three-phase voltage regulator for supplying a well balanced three-phase constant voltage having good sinusoidal wave-form, said regulator comprising three linear reactors each having a primary and secondary winding wound on a common magnetic core, said primary and secondary winding being connected in series, said reactors each being connected between an input terminal and an output terminal, three saturable reactors each having a primary and secondary winding wound on a common magnetic core, and three condensers, each condenser being connected in parallel with a respective primary winding of a saturable reactor to form a tank circuit resonating at a fundamental frequency, the connection of the tank circuit to the linear reactor being from an intermediate point of the primary windings of the saturable reactors to the point at which the primary and secondary windings of the linear reactors are connected, the ends of said tank circuits opposite the conections to the linear reactors being connected in star, and said secondary windings of each saturable reactor being connected in delta, whereby third harmonics and multiples thereof are substantially eliminated from the tank circuits and are thereby substantially eliminated from the output voltage at the output terminals.

2. A three-phase voltage regulator for supplying a well balanced three-phase constant voltage having good sinusoidal wave form, said regulator comprising three linear reactors each having a primary and secondary winding wound on a common magnetic core, said reactors each being connected between an input terminal and an output terminal, three saturable reactors each having at least a primary winding wound on a magnetic core, and three condensers, each condenser being connected in parallel with a respective primary winding of a saturable reactor to form a tank circuit resonating at a fundamental frequency, each tank circuit being connected to a respective one of the primary windings of the linear reactors, and coupling means coupling said tank circuits only to each other for substantially eliminating third harmonics and multiples thereof in the tank circuits and thereby substantially eliminate such harmonics from the output voltage at the output terminals.

3. A three-phase voltage regulator as claimed in claim 2 in which said coupling means comprises secondary windings for each of said saturable reactors, said secondary windings being connected in delta.

4. A three-phase voltage regulator as claimed in claim 2 in which said coupling means comprises electrical connections between said tank circuits connecting the ends of said tank circuits opposite the connections of the tank circuits to the linear reactors in a star connection.

5. A three-phase voltage regulator as claimed in claim 2 in which said linear reactor windings are magnetically coupled through the magnetic core, the connection of the tank circuits to the linear reactors being from a point intermediate the ends of the primary windings of the saturable reactors to the primary windings of the linear reactors, and said coupling means comprises secondary windings wound on the magnetic cores of each saturable reactor, said secondary windings being connected in delta, and the secondary windings of the linear reactors being connected between the apexes of the secondary saturable reactor winding delta connection and the load terminals.

6. A three-phase voltage regulator as claimed in claim 2 in which said linear reactor windings are electrically connected in series, the connection of said tank circuits to the lienar reactors being from a point intermediate the ends of the primary windings of the saturable reactors to the point at which the primary and secondary windings of the linear reactors are connected, and said coupling means comprises electrical connections between the respective tank circuits for each phase and the connection between the linear reactor and the tank circuit for the next phase, whereby the tank circuits are connected in delta through the linear reactor connections.

7. A three-phase voltage regulator as claimed in claim 2 in which said linear reactor windings are magnetically coupled through the magnetic cores, the connection of said tank circuits to the linear reactors being from one side of the tank circuits to the primary winding of the linear reactors, and said coupling means comprises electrical connections between the respective tank circuits for each phase and the connection between the linear reactor and the tank circuit for the next phase, and secondary windings wound on the magnetic cores of each saturable reactor and having their one ends star connected, the secondary windings of the linear reactors being connected between the other end of the saturable reactor secondary windings and the load terminals.

8. A three-phase voltage regulator as claimed in claim 2 in which said linear reactor windings are magnetically coupled through the magnetic cores, the connection of said tank circuits to the linear reactors being from one side of the tank circuits to the primary winding of the linear reactors, and said coupling means comprises electrical connections between the respective tank circuits for each phase and the connection between the linear reactor and the tank circuit for the next phase, and secondary windings wound on the magnetic cores of each saturable reactor, and being delta connected, the secondary windings of the linear reactors being connected between the apexes of the secondary saturable reactor winding delta connection and the load terminals.

9. A three-phase voltage regulator as claimed in claim 2 in which said linear reactor windings are magnetically coupled through the magnetic cores, the connection of said tank circuits to the linear reactors being from one side of the tank circuits to the primary winding of the linear reactors, and said coupling means comprises electrical connections from the other sides of the tank circuits and connecting them in a star connection, and secondary windings wound on the magnetic cores of each saturable reactor and being delta connected, the secondary windings of the linear reactors each being connected between a point intermediate the ends of the primary windings of the respective saturable reactors and the respective load terminal.

10. A three-phase voltage regulator as claimed in claim 9 in which the cores for said saturable reactor windings are connected to each other in a three-leg core.

11. A three-phase voltage regulator as claimed in claim 2 in which said linear reactor windings are magnetically coupled through the magnetic cores, the connection of said tank circuits to the linear reactors being from one side of the tank circuits to the primary winding of the linear reactors, and said coupling means comprises electrical connections from the other sides of the tank circuits and connecting them in a star connection, secondary windings wound on the magnetic cores of each saturable reactor and having their one ends star connected, and tertiary windings wound on the magnetic cores of each saturable reactor and delta connected, the secondary windings of the linear reactors being connected between the other ends of the saturable reactor secondary windings and the respective load terminals.

References Cited by the Examiner

UNITED STATES PATENTS

| 2,377,152 | 5/1945 | Huge | 323—61 |
| 3,041,523 | 6/1962 | Kuba | 323—61 |

FOREIGN PATENTS 604,985  11/1934  Germany.

MILTON O. HIRSHFIELD, *Primary Examiner.*

LLOYD McCOLLUM, *Examiner.*